(12) United States Patent
Dell'Amico

(10) Patent No.: US 11,438,378 B1
(45) Date of Patent: Sep. 6, 2022

(54) SYSTEMS AND METHODS FOR PROTECTING AGAINST PASSWORD ATTACKS BY CONCEALING THE USE OF HONEYWORDS IN PASSWORD FILES

(71) Applicant: Symantec Corporation, Mountain View, CA (US)

(72) Inventor: Matteo Dell'Amico, Antibes (FR)

(73) Assignee: NortonLifeLock Inc., Tempe, AZ (US)

( * ) Notice: Subject to any disclaimer, the term of this patent is extended or adjusted under 35 U.S.C. 154(b) by 182 days.

(21) Appl. No.: 16/719,566

(22) Filed: Dec. 18, 2019

(51) Int. Cl.
*H04L 9/40* (2022.01)
*H04L 9/32* (2006.01)

(52) U.S. Cl.
CPC ........ *H04L 63/1491* (2013.01); *H04L 9/3236* (2013.01); *H04L 63/083* (2013.01); *H04L 63/1416* (2013.01)

(58) Field of Classification Search
CPC . H04L 63/1491; H04L 63/083; H04L 9/3236; H04L 63/1416
See application file for complete search history.

(56) References Cited

U.S. PATENT DOCUMENTS

| | | | | |
|---|---|---|---|---|
| 6,959,394 | B1 * | 10/2005 | Brickell | H04L 63/0435 726/19 |
| 9,230,092 | B1 * | 1/2016 | Juels | H04L 63/083 |
| 9,325,499 | B1 * | 4/2016 | Juels | H04L 9/0861 |
| 9,537,857 | B1 * | 1/2017 | Koved | H04L 63/06 |
| 9,843,574 | B1 * | 12/2017 | Triandopoulos | H04L 9/3226 |
| 10,162,962 | B1 * | 12/2018 | Glick | G06F 21/6209 |
| 10,735,403 | B1 * | 8/2020 | Triandopoulos | H04L 9/3226 |
| 2002/0087890 | A1 * | 7/2002 | Chan | G06F 21/41 726/5 |
| 2006/0104441 | A1 * | 5/2006 | Johansson | G06F 21/31 380/44 |

(Continued)

OTHER PUBLICATIONS

"Why add username to salt before hashing a password?" Article dated Mar. 10, 2018 as verified by the Internet Archive (4 pages) http://web.archive.org/web/20180310153721/https://security.stackexchange.com/questions/181158/why-add-username-to-salt-before-hashing-a-password (Year: 2018).*

(Continued)

*Primary Examiner* — Joseph P Hirl
*Assistant Examiner* — Thomas A Gyorfi
(74) *Attorney, Agent, or Firm* — FisherBroyles, LLP

(57) ABSTRACT

The disclosed computer-implemented method for protecting against password attacks by concealing the use of honeywords in password files may include (i) receiving a login request comprising a candidate password for a user, (ii) authenticating the login request by determining whether a hash of a true password for the user stored in a honeyserver matches a hash of the candidate password, (iii) determining whether the candidate password has matches a hash of a honeyword stored in a password file when the true password hash fails to match the candidate password hash, (iv) classifying the password file as being potentially compromised when the candidate password hash matches the honeyword hash stored in the password file, and (v) performing a security action that protects against a password attack utilizing the potentially compromised password file. Various other methods, systems, and computer-readable media are also disclosed.

20 Claims, 7 Drawing Sheets

(56) References Cited

U.S. PATENT DOCUMENTS

2012/0303830 A1* 11/2012 Tobioka ............... G06F 21/335
709/229
2013/0007869 A1* 1/2013 Thomas ................. G06F 21/41
726/9
2014/0298433 A1* 10/2014 McLaughlin ....... H04L 63/0876
726/6

OTHER PUBLICATIONS

Juels et al., "Honeywords: Making Password-Cracking Detectable", Proceedings of the 2013 ACM SIGSAC conference on Computer & communications security, Version 2.0, May 2, 2013, pp. 1-19.
Wang et al., "A Security Analysis of Honeywords", Network and Distributed Systems Security (NDSS) Symposium, Feb. 18-21, 2018, pp. 1-15.
Erguler, Imran, "Achieving Flatness: Selecting the Honeywords from Existing User Passwords", IEEE Transactions on Dependable and Secure Computing, 2015, pp. 1-14.
Melicher et al., "Fast, Lean, and Accurate: Modeling Password Guessability Using Neural Networks", Proceedings of the 25th USENIX Security Symposium, Aug. 10-12, 2016, 18 pages.
Weir et al., "Password Cracking Using Probabilistic Context-Free Grammars", 30th IEEE Symposium on Security and Privacy, 2009, pp. 391-405.
Narayanan et al., "Fast Dictionary Attacks on Passwords Using Time-Space Tradeoff", Proceedings of the 12th ACM conference on Computer and Communications Security, Nov. 7-11, 2005, 9 pages.

* cited by examiner

SYSTEMS AND METHODS FOR PROTECTING AGAINST PASSWORD ATTACKS BY CONCEALING THE USE OF HONEYWORDS IN PASSWORD FILES

BACKGROUND

Threat protection security software often utilizes techniques designed to combat password attacks against users of enterprise and consumer computing systems by making leaks of password files detectable using honeywords (i.e., fake passwords). For example, conventional techniques include generating and mixing one or more hashes of honeywords into a password file containing a hash of a real password for a user login account utilized to access an online service (e.g., a social networking service). When a candidate password is submitted in a login request by a user, a special server (i.e., a honeyserver) checks the submission against two stored indexes (e.g., i and j) of usernames and passwords. Thus, an i,j pair in the honeyserver means that the correct password for a user i is the j-th password stored in the honeyserver. However, when the wrong password for an index (e.g., the wrong "j") is used, this is evidence that the password file has been leaked and remedial action may then be taken (e.g., an alarm may be raised and/or the login request may either be denied or alternatively allowed for routing to an isolated network container such as a honeypot).

Conventional password protection techniques utilizing honeywords however, may often fail due to attackers finding a password file containing more than one password per user and instantly concluding that honeywords are being utilized. As a result, an attacker may then (1) either utilize social engineering (to confirm whether or not they have found the correct password in the leaked password file), (2) expect their login request to be sent to a honeypot account (at which time the attacker may then try another password in the leaked password file), and/or (3) expect to set off an alarm due to not utilizing the correct password (at which time the attacker may then try another password in the leaked password file). Additionally, attackers may be likely to pay more attention (e.g., take measures to avoid being tracked), because the mere presence of honeywords signals that they are likely to be watched.

SUMMARY

As will be described in greater detail below, the present disclosure describes various systems and methods for protecting against password attacks by concealing the use of honeywords in password files.

In one example, a computer-implemented method for protecting against password attacks by concealing the use of honeywords in password files may include (i) receiving a login request comprising a candidate password for a user, (ii) authenticating the login request by determining whether a hash of a true password for the user stored in a honeyserver matches a hash of the candidate password, (iii) determining whether the hash of the candidate password matches a hash of a honeyword (e.g., a false or fake password) stored in a password file when the hash of the true password fails to match the hash of the candidate password, (iv) classifying the password file as being potentially compromised when the hash of the candidate password matches the hash of the honeyword stored in the password file, and (v) performing a security action that protects against a password attack utilizing the potentially compromised password file.

In some examples, the authentication of the login request may include determining whether a cryptographic hash including a user identification and a concatenation of a salt for the user and the candidate password matches a cryptographic hash including the user identification and a concatenation of the salt for the user and the true password. In some embodiments, determining whether the hash of the candidate password matches the hash of the honeyword stored in the password file may include determining whether a cryptographic hash including a concatenation of a salt for the user and the candidate password matches a cryptographic hash including a concatenation of the salt for the user and the honeyword.

In some examples, the password file may store a set of cryptographic hashes for a group of users and a random subset of the cryptographic hashes may be hashes of honeywords. In other examples, all of the cryptographic hashes may be hashes of honeywords. In other examples, a predetermined number of the cryptographic hashes may be hashes of honeywords. In some examples, the contents of the password file may be stored in a database table.

In some examples, the security action that protects against a password attack utilizing the potentially compromised password file may include (i) denying the login request and (ii) generating an alert notifying a user account administrator of the potentially compromised password file. In other examples, the security action may include accepting the candidate password for logging the user into an isolated phony user account.

In one embodiment, a system for protecting against password attacks by concealing the use of honeywords in password files may include at least one physical processor and physical memory that includes a set of modules and computer-executable instructions that, when executed by the physical processor, cause the physical processor to (i) receive, by a receiving module, a login request comprising a candidate password for a user, (ii) authenticate, by an authentication module, the login request by determining whether a hash of a true password for the user stored in a honeyserver matches a hash of the candidate password, (iii) determine, by a determining module, whether the hash of the candidate password matches a hash of a honeyword stored in a password file when the hash of the true password fails to match the hash of the candidate password, (iv) classify, by a classification module, the password file as being potentially compromised when the hash of the candidate password matches the hash of the honeyword stored in the password file, and (v) perform, by a security module, a security action that protects against a password attack utilizing the potentially compromised password file.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive a login request comprising a candidate password for a user, (ii) authenticate the login request by determining whether a hash of a true password for the user stored in a honeyserver matches a hash of the candidate password, (iii) determine whether the hash of the candidate password matches a hash of a honeyword stored in a password file when the hash of the true password fails to match the hash of the candidate password, (iv) classify the password file as being potentially compromised when the hash of the candidate password matches the hash of the honeyword stored in the password file, and (v) perform a security action that protects against a password attack utilizing the potentially compromised password file.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
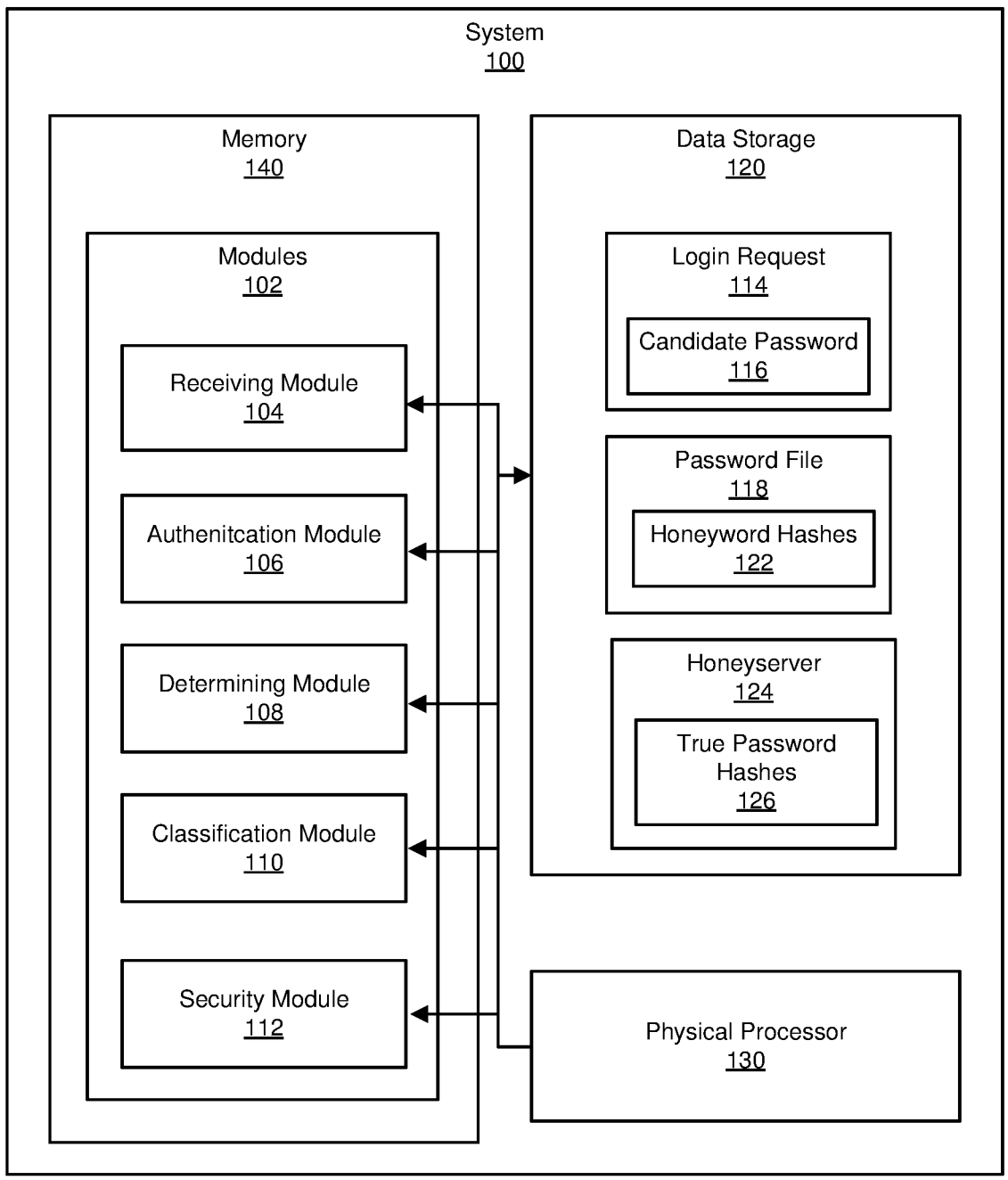
FIG. 1 is a block diagram of an example system for protecting against password attacks by concealing the use of honeywords in password files.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for protecting against password attacks by concealing the use of honeywords in password files. As will be described in greater detail below, by generating a single cryptographic password hash per user in a password file, the systems and methods described herein may prevent the detection of honeywords by attackers. By generating the single password hash in this way, the systems and methods described herein may be able to disguise honeywords from real passwords thereby making it less likely for an attacker to discover them and consequently making it more likely for password file leaks (e.g., password file exfiltration) to be detected. Thus, the systems and methods described herein may overcome drawbacks associated with conventional techniques in which multiple hashes containing both honeywords and real passwords are generated for a single user thereby allowing an attacker to easily detect their presence in a password file. In addition, the systems and methods described herein may improve the security of a computing device by protecting against password attacks utilizing passwords extracted from leaked password files.

Figure 2:
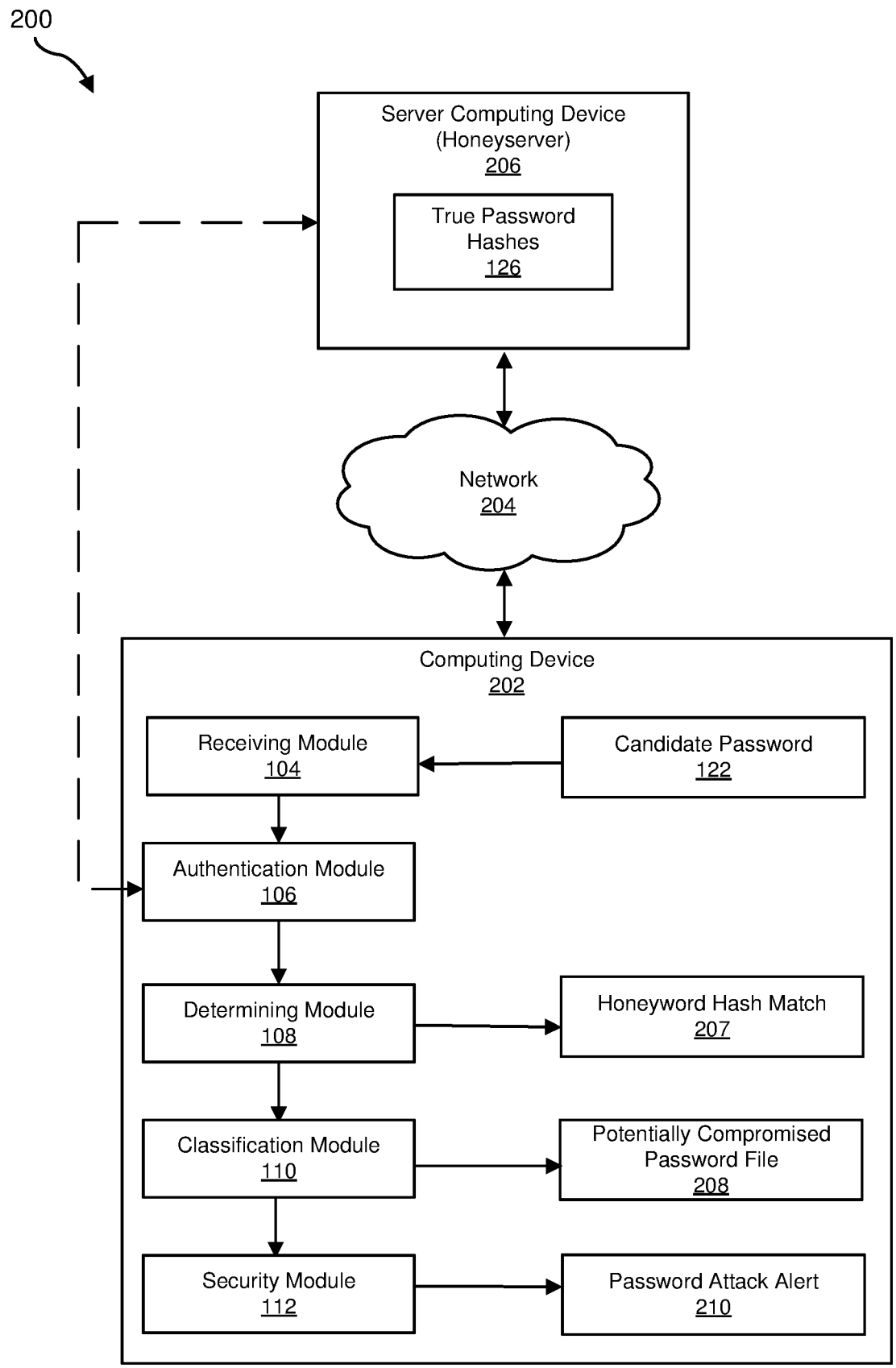
FIG. 2 is a block diagram of an additional example system for protecting against password attacks by concealing the use of honeywords in password files.
Figure 4:
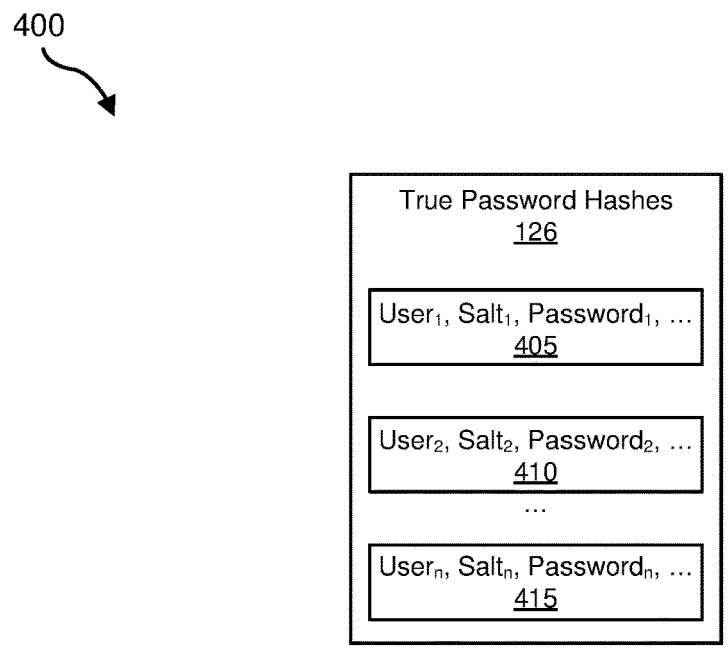
FIG. 4 is a block diagram of an example password file containing a set of hashes that may be utilized in the example systems of FIGS. 1 and 2.
Figure 5:
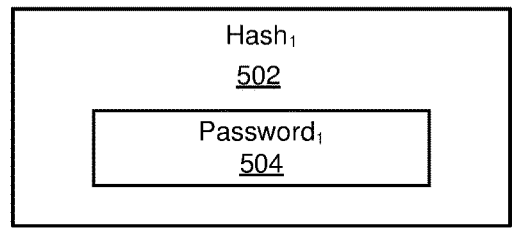
FIG. 5 is a block diagram of example hashes of honeywords that may be utilized in the example systems of FIGS. 1 and 2.

The following will provide, with reference to FIGS. 1-2, detailed descriptions of example systems for protecting against password attacks by concealing the use of honeywords in password files. Detailed descriptions of corresponding computer-implemented methods will also be provided in connection with FIG. 3. In addition, a detailed description of an example password file containing a set of hashes will also be provided in connection with FIG. 4. In addition, a detailed description of example hashes of honeywords will also be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of an example system 100 for protecting against password attacks by concealing the use of honeywords in password files. As illustrated in this figure, example system 100 may include one or more modules 102 for performing one or more tasks. For example, and as will be explained in greater detail below, example system 100 may include a receiving module 104 that accesses a login request 114 including a candidate password 116. Example system 100 may additionally include an authentication module 106 that authenticates login request 114 by determining whether a hash of a true password (i.e., a true password hash 126) for the user stored in a honeyserver 124 matches a hash of candidate password 116. Example system 100 may also include a determining module 108 that determines whether the hash of candidate password 116 matches a honeyword hash 122 stored in a password file 118 when a true password hash 126 fails to match the hash of candidate password. 116 Example system 100 may additionally include a classification module 110 that classifies password file 118 as being potentially compromised when the hash of the candidate password 116 matches a honeyword hash 122 stored in password file 118. Example system 100 may also include a security module 112 that protects against a password attack utilizing the potentially compromised password file. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server computing device 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate protecting against password attacks by concealing the use of honeywords in password files. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example, data storage 120 may store login request 114 and password file 118.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server computing device 206 via a network 204. In one example, all or a portion of the functionality of modules 102 may be performed by computing device 202, server computing device 206 and/or any other suitable computing system. As will be described in greater detail below, one or more of modules 102 from FIG. 1 may, when executed by at least one processor of computing device 202, enable computing device 202 to protect against password attacks by concealing the use of honeywords in password files.

For example, receiving module 104 may receive login request 114 containing candidate password 116 from computing device 202. Next, authentication module 106 may authenticate login request 114 by determining whether a hash of a true password for the user (i.e., a true password hash 126) stored in a honeyserver (e.g., server computing device 206) matches a hash of candidate password 116. Then, determining module 108 may determine a honeyword match 207 by determining whether the hash of candidate password 116 matches a honeyword hash 122, stored in password file 118, when a true password hash 126 fails to match the hash of candidate password 116. Next, classification module 110 may classify password file 118 as being potentially compromised upon the determination of honeyword hash match 207 (i.e., when the hash of candidate password 116 matches a honeyword hash 122 stored in password file 118 for a user). Finally, security module 112 may perform a security action (e.g., generate a password attack alert 210) that protects against a password attack that utilizes potentially compromised password file 208.

Computing device 202 generally represents any type or form of computing device capable of reading computer-executable instructions. In some examples, computing device 202 may be a client endpoint device running web browser software configured to receive user login requests for accessing various web services (e.g., social networking websites, e-commerce websites, financial services websites, etc.) and for storing a password file or password database table containing honeyword password hashes for various users. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server computing device 206 generally represents any type or form of computing device that is capable of reading and/or executing computer-readable instructions. In some examples, server computing device 206 may be a honeyserver for storing a set of true (e.g., real) password hashes that are utilized, for a group of users, to checks that users are logging in with true passwords and not honeywords. Additional examples of server computing device 206 include, without limitation, web servers, application servers, storage servers, and/or database servers configured to run certain software applications and/or provide various security, web, storage, and/or database services. Although illustrated as a single entity in FIG. 2, server computing device 206 may include and/or represent a plurality of servers that work and/or operate in conjunction with one another.

Network 204 generally represents any medium or architecture capable of facilitating communication or data transfer. In one example, network 204 may facilitate communication between computing device 202 and server computing device 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
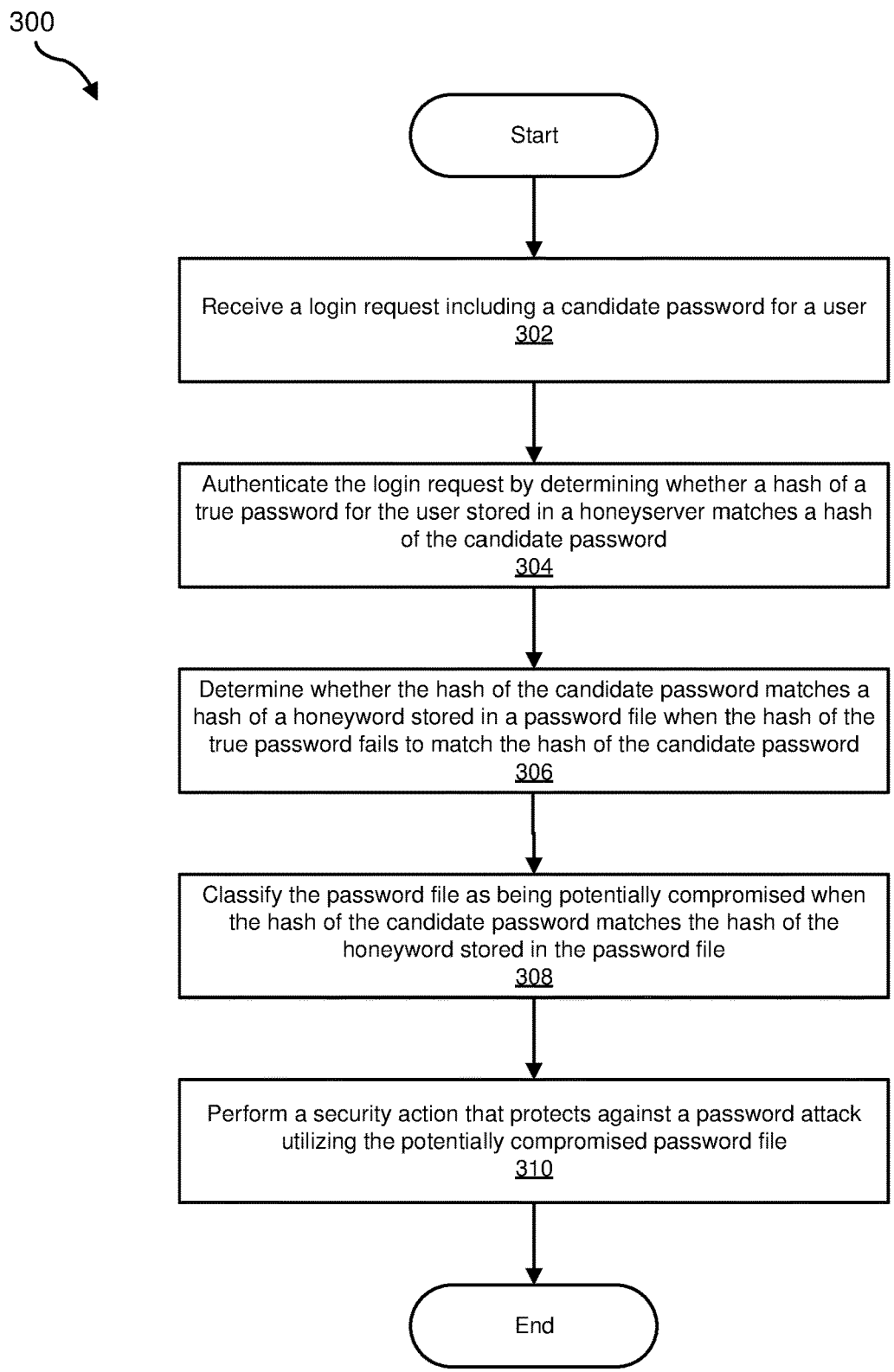
FIG. 3 is a flow diagram of an example method for protecting against password attacks by concealing the use of honeywords in password files.

FIG. 3 is a flow diagram of an example computer-implemented method 300 for protecting against password attacks by concealing the use of honeywords in password files. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive a login request including a candidate password. For example, receiving module 104 may, as part of computing device 202 in FIG. 2, receive login request 114 containing candidate password 116, from a user.

Receiving module 104 may receive login request 114 in a variety of ways. In some embodiments, receiving module 104 may receive login request 114 from a user of computing device 202 following the user entering a username and password (e.g., candidate password 116) input on computing device 202 for accessing a web service such as a social networking website, an e-commerce website, a financial services website, an enterprise computing website, etc.

At step 304, one or more of the systems described herein may authenticate the login request received at step 302 by determining whether a hash of a true password for the user stored in a honeyserver matches a hash of the candidate password. For example, authentication module 106 may, as part of computing device 202 in FIG. 2, whether a true password hash 126 for the user stored in a honeyserver (e.g., server computing device 206) matches a hash of candidate password 116.

The term "honeyword," as used herein, generally refers to an incorrect or fake password utilized as a security measure against password attacks on user login accounts. For example, an account administrator may associate one or more honeywords with a user account such that a party attempting to login to the user account with a fake password (i.e., the honeyword) may be assumed to be an attacker. In some examples, honeywords may be part of a honeypot which is a computer security mechanism set to detect, deflect, or, in some manner, counteract attempts at unauthorized use of information systems. In some examples, a honeypot may consist of a data container (e.g., on a website) that appears to be a legitimate part of the website, but which, in reality, is isolated and monitored and is further utilized to block an attacker.

In some examples, the hash of candidate password 116 may be generated by computing a hash of a user ID, a salt (e.g., a randomly generated string) associated with the user ID, and candidate password 116. In some examples, salt associated with the user ID may be stored and retrieved from password file 118. In some examples, each true password hash 126 stored in server computing device 206 may be a single, salted hash per user that may be created by generating a data structure including a hash that includes a user identification (i.e., user ID) or username and a concatenation of a salt (e.g., a randomly generated character string) and the true password associated with the user ID. For example, as shown in block diagram 400 of FIG. 4, true password hashes 405, 410, and 415 may be generated for a User$_1$, User$_2$, and User$_n$. In each of true password hashes 405, 410, and 415, the "User" may represent a user ID, the "Salt" may represent a randomly generated character string for the User ID, and the "Password" may represent the true or actual password for the user ID. In some examples, the Salt may be separately stored in a password file (e.g., password file 118) on computing device 202.

In some examples, the data structure may be implemented for a set of hashes according to the following protocol:

set($H_i$) where $H_i$=h(user$_i$//salt$_i$//password$_i$) to set password$_i$ for user$_i$ unset($H_i$) where $H_i$=h(user$_i$//salt$_i$//password$_i$) to unset password$_i$ for user$_i$ check($H_i$) where $H_i$=h(user$_i$//salt//p) when a login is attempted for user$_i$ with password p In the above protocol, the terms "set" and "unset" add and remove elements (e.g., user$_i$, salt$_i$, and password$_i$), and the term "check" returns whether an item is in the set. Moreover, in the protocol, if the "check" returns a false value, an attempted user login is declared invalid. If in addition, a hash of a candidate password utilized in a login request matches a honeyword hash in a password file, then the password file is likely to have been leaked and an attack is taking place.

Returning now to step 304 of FIG. 3, authentication module 106 may determine whether hash of the candidate password matches a true password hash stored in the honeyserver in a variety of ways. In some examples, authentication module 106 may determine whether a cryptographic hash including a user ID and a concatenation of a salt for the user ID and the candidate password matches a cryptographic hash including the user ID and a concatenation of the salt for the user ID and the true password. If, upon making the aforementioned determination, authentication module 106 determines that there is not a match (e.g., the check of the hash of candidate password 116 against a true password hash 126 in server computing device (e.g., honeyserver) 206 returns a false value), then the login is determined to be invalid. If, on the other hand, authentication module 106 determines that there is a match (e.g., of the hash of candidate password 116 against a true password hash 126 returns a true value, then the login is determined to be valid.

At step 306, one or more of the systems described herein may determine whether the hash of the candidate password matches a hash of a honeyword stored in a password file when the hash of the true password fails to match the hash of the candidate password. For example, determining module 108 may, as part of computing device 202 in FIG. 2, determine whether the hash of candidate password 116 matches a honeyword hash 122 in password file 118.

Determining module 108 may determine whether the hash of candidate password 116 matches a honeyword hash 122 in password file 118 in a variety of ways. In one example, determining module 108 may determine whether a cryptographic hash including a concatenation of a salt for the user (e.g., a user ID) and candidate password 116 matches a cryptographic hash including a concatenation of a salt for the user (e.g., the User ID) and a honeyword assigned by a password account administrator to the user.

In some examples, the administrator may determine which of a group of user IDs will have their passwords replaced with honeyword hashes 122 in password file 118. In some examples, an administrator may store honeyword hashes 122 (e.g., cryptographic hashes) for password file 118 for a random subset of users in a user group. In other examples, an administrator may store honeyword hashes 122 for all of a group of users. In other examples, an administrator may store honeyword hashes 122 only for strategic/important users in a user group. For example, as shown in block diagram 500 of FIG. 5, a group of hashes for different users may include real passwords or honeywords as determined by an administrator for a password file. For example, Hash$_1$ 502 may be a hash of Password$_1$ 504 (i.e., a true password), Hash$_2$ 506 may be a hash of Honeyword$_2$ 508, and Hash$_n$ 510 may be a hash of Honeyword$_n$ 512.

Returning now to FIG. 3, at step 308, one or more of the systems described herein may classify the password file as being potentially compromised when the hash of the candidate password matches the hash of the honeyword stored in the password file. For example, classification module 110 may, as part of computing device 202 in FIG. 2, classify password file 118 as being potentially compromised when the hash of candidate password 116 matches a honeyword hash 122. In this example, the aforementioned match may be evidence that password file 118 has been leaked to an attacker who currently attempting to login to a user account via login request 114.

Classification module 110 may classify password file 118 as being potentially compromised in a variety of ways. In one example, classification module 110 may generate a hash of candidate password 116 by concatenating a salt (i.e., a random string associated with a user ID submitted in login request 114) with candidate password 116 and comparing the result (i.e., the hash) to a honeyword hash 122 previously generated by computing a hash of the salt with a honeyword assigned by an administrator for the user ID submitted in login request 114.

At step 310, one or more of the systems described herein may perform a security action that protects against a password attack utilizing the potentially compromised password file. For example, security module 112 may, as part of computing device 202 in FIG. 2, perform a security action that protects against a password attack utilizing potentially compromised password file 208.

Security module 112 may perform the aforementioned security action in a variety of ways. In some examples, security module 112 may deny login request 114 and generate password attack alert 210 which may include an alert notifying a user account administrator of potentially compromised password file 208. Alternatively, security module 112 may accept login request 114 and then login the attacker into a honeypot account.

As explained in connection with method 300 above, the systems and methods described herein provide for protecting against password attacks by concealing the use of honeywords in password files. A security application may be configured that generates a single (salted) hash per user in a password file. For each user, the single hash could be the hash of a real password or the hash of a honeyword. A server (e.g., a honeyserver) may then implement a data structure for storing a set of hashes as triple (e.g., salt, userid, password). Then whenever a login is attempted, an authentication binary may be utilized to check with the server and determine whether the hash triple is present in a hash of a candidate password. If the hash triple is present, then the login is allowed. On the other hand, if the hash triple is not present, the login is denied. Additionally, if a hash of the submitted password in the denied login matches a hash of a honeyword in the password file, then the password file may be determined to have been leaked and an alarm may be triggered. An account administrator may selectively determine whether a set of hashes stored in a password file are hashes of a real password or a honeyword. For example, an administrator may choose to setup honeywords for all users or only for some users (e.g., administrative or other high value user accounts). The use of honeywords in this way may improve stealthiness as an attacker may not recognize that honeywords are being utilized even when the attacker may know one or more real candidate passwords.

Figure 6:
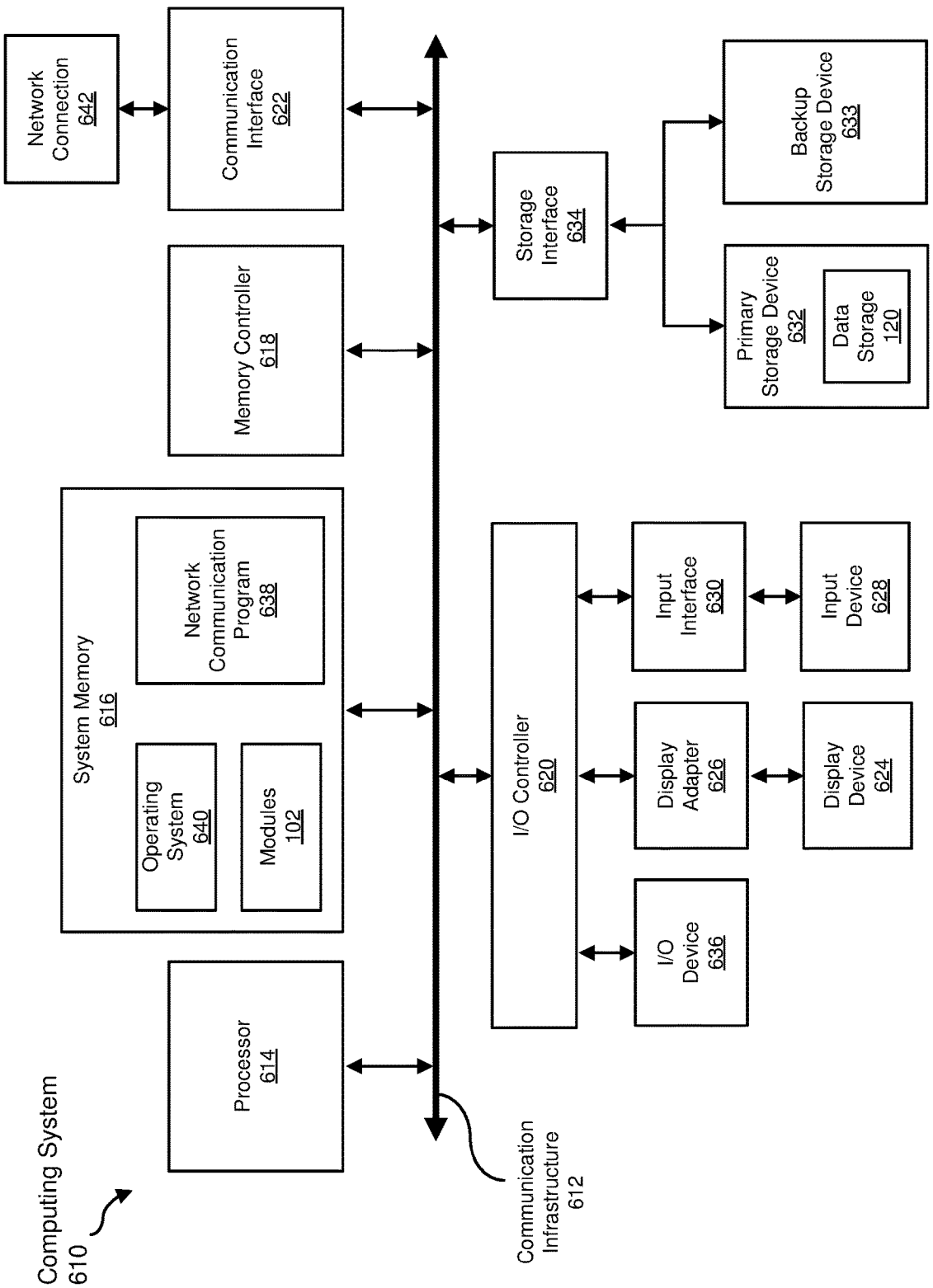
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
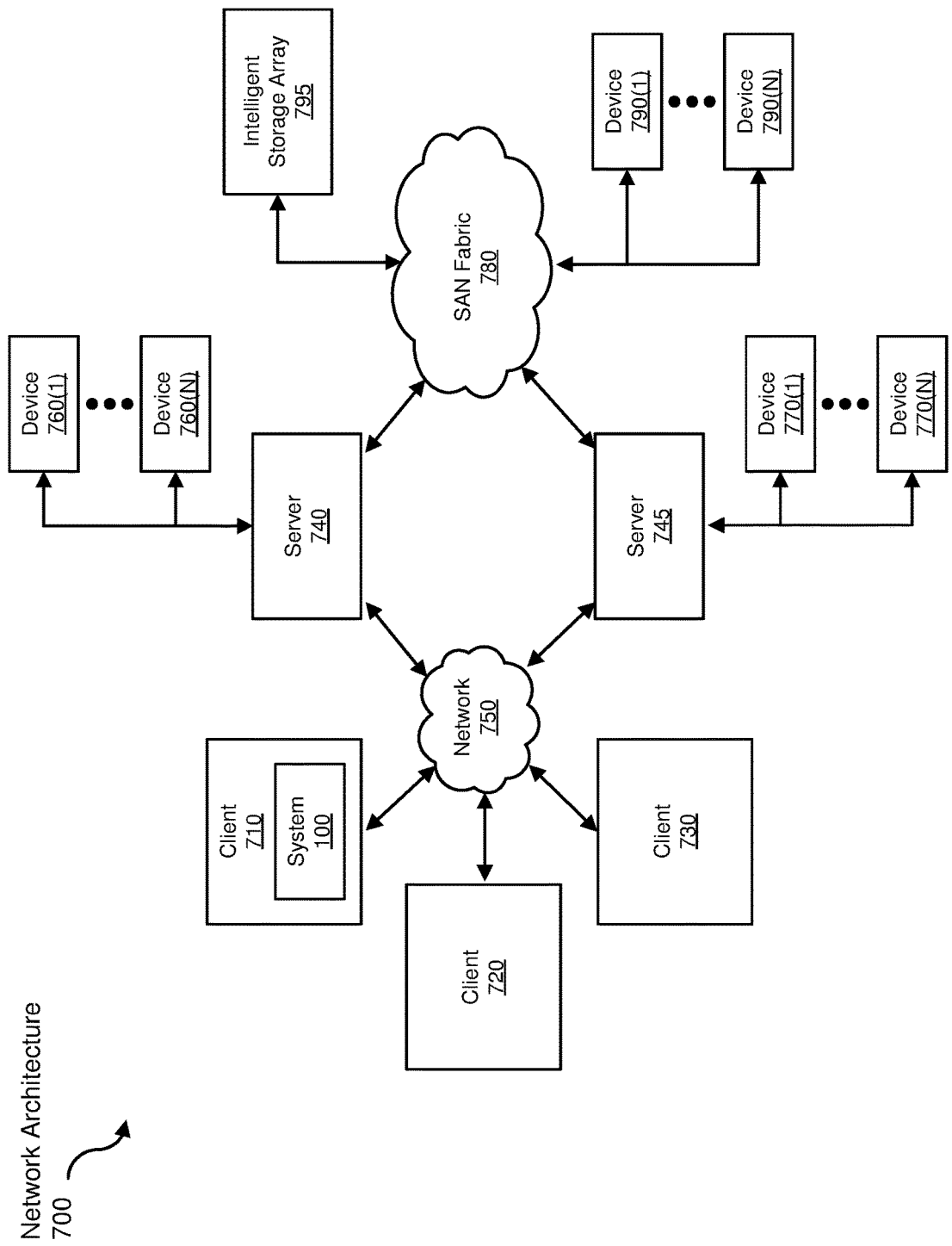
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for protecting against password attacks by concealing the use of honeywords in password files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting against password attacks by concealing the use of honeywords in password files, at least a portion of the method being performed by one or more computing devices comprising at least one processor, the method comprising:
receiving, by the one or more computing devices, a login request comprising a candidate password for a user;
authenticating, by the one or more computing devices, the login request by determining whether a hash of a true password for the user stored in a honeyserver matches a hash of the candidate password, wherein the hash of the true password for the user stored in the honeyserver is generated by computing a triple, the triple comprising a data structure including a user identification, a salt, and the true password, wherein the salt comprises a randomly generated string that is stored and the true password is associated with the user identification;
determining, by the one or more computing devices, whether the hash of the candidate password matches a hash of a honeyword stored in a password file when the hash of the true password fails to match the hash of the candidate password, wherein the password file stores a set of cryptographic hashes containing the honeyword only for a random subset of a plurality of users in a user group;
classifying, by the one or more computing devices, the password file as being potentially compromised when the hash of the candidate password matches the hash of the honeyword stored in the password file; and
performing, by the one or more computing devices, a security action that protects against a password attack utilizing the potentially compromised password file.

2. The computer-implemented method of claim 1, wherein determining whether the hash of the true password for the user stored in the honeyserver matches the hash of the candidate password comprises determining whether a cryptographic hash including a user identification and a salt for the user and the candidate password matches the triple.

3. The computer-implemented method of claim 1, wherein determining whether the hash of the candidate password matches the hash of the honeyword stored in the password file comprises determining whether a cryptographic hash including a user identification and a salt for the user and the candidate password matches a cryptographic hash including the salt for the user and the honeyword.

4. The computer-implemented method of claim 1, wherein a predetermined number of the cryptographic hashes contains the honeyword.

5. The computer-implemented method of claim 1, wherein performing the security action comprises:
denying the login request; and
generating an alert notifying a user account administrator of the potentially compromised password file.

6. The computer-implemented method of claim 1, wherein performing the security action comprises accepting the candidate password for logging into an isolated phony user account.

7. The computer-implemented method of claim 1, wherein the honeyword comprises a false password.

8. A system for protecting against password attacks by concealing the use of honeywords in password files, the system comprising:
at least one physical processor;
physical memory comprising computer-executable instructions and one or more modules that, when executed by the physical processor, cause the physical processor to:
receive, by a receiving module, a login request comprising a candidate password for a user;
authenticate, by an authentication module, the login request by determining whether a hash of a true password for the user stored in a honeyserver matches a hash of the candidate password, wherein the hash of the true password for the user stored in the honeyserver is generated by computing a triple, the triple comprising a data structure including a user identification, a salt, and the true password, wherein the salt comprises a randomly generated string that is stored and the true password is associated with the user identification;
determine, by a determining module, whether the hash of the candidate password matches a hash of a honeyword stored in a password file when the hash of the true password fails to match the hash of the candidate password, wherein the password file stores a set of cryptographic hashes containing the honeyword only for a random subset of a plurality of users in a user group;
classify, by a classification module, the password file as being potentially compromised when the hash of the candidate password matches the hash of the honeyword stored in the password file; and
perform, by a security module, a security action that protects against a password attack utilizing the potentially compromised password file.

9. The system of claim 8, wherein the authentication module determines whether the hash of the true password for the user stored in the honeyserver matches the hash of the candidate password by determining whether a cryptographic hash including a user identification and a salt for the user and the candidate password matches the triple.

10. The system of claim 8, wherein the determining module determines whether the hash of the candidate password matches the hash of the honeyword stored in the password file by determining whether a cryptographic hash including a user identification and a salt for the user and the candidate password matches a cryptographic hash including a concatenation of the salt for the user and the honeyword.

11. The system of claim 8, wherein a predetermined number of the cryptographic hashes contains the honeyword.

12. The system of claim 8, wherein the security module performs the security action by:
denying the login request; and
generating an alert notifying a user account administrator of the potentially compromised password file.

13. The system of claim 8, wherein the security module performs the security action by accepting the candidate password for logging into an isolated phony user account.

14. The system of claim 8, wherein the honeyword comprises a false password.

15. A non-transitory computer-readable medium comprising one or more computer-executable instructions that, when executed by at least one processor of a computing device, cause the computing device to:
receive a login request comprising a candidate password for a user;
authenticate the login request by determining whether a hash of a true password for the user stored in a honeyserver matches a hash of the candidate password, wherein the hash of the true password for the user stored in the honeyserver is generated by computing a triple, the triple comprising a data structure including a user identification, a salt, and the true password, wherein the salt comprises a randomly generated string that is stored and the true password is associated with the user identification;

determine whether the hash of the candidate password matches a hash of a honeyword stored in a password file when the hash of the true password fails to match the hash of the candidate password, wherein the password file stores a set of cryptographic hashes containing the honeyword only for a random subset of a plurality of users in a user group;

classify the password file as being potentially compromised when the hash of the candidate password matches the hash of the honeyword stored in the password file; and perform a security action that protects against a password attack utilizing the potentially compromised password file.

16. The non-transitory computer-readable medium of claim 15, wherein the one or more computer-executable instructions cause the computing device to determine whether the hash of the true password for the user stored in the honeyserver matches the hash of the candidate password by determining whether a cryptographic hash including a user identification and a salt for the user and the candidate password matches the triple.

17. The non-transitory computer-readable medium of claim 15, wherein a predetermined number of the cryptographic hashes contains the honeyword.

18. The non-transitory computer-readable medium of claim 15, wherein the one or more computer-executable instructions cause the computing device to perform the security action by:

denying the login request; and generating an alert notifying a user account administrator of the potentially compromised password file.

19. The non-transitory computer-readable medium of claim 15, wherein the one or more computer-executable instructions cause the computing device to perform the security action by accepting the candidate password for logging into an isolated phony user account.

20. The non-transitory computer-readable medium of claim 15, wherein the honeyword comprises a false password.

* * * * *